(12) United States Patent
Koski, II et al.

(10) Patent No.: US 7,638,897 B2
(45) Date of Patent: Dec. 29, 2009

(54) METHOD AND SYSTEM FOR POWERING A PATIENT MONITORING SYSTEM

(75) Inventors: Roy D. Koski, II, West Bend, WI (US); David L. Schieble, Oconomowoc, WI (US); James M. Gray, Fox Point, WI (US); Alan E. Clapp, Cedarburg, WI (US); Paul D. Lindquist, Milwaukee, WI (US)

(73) Assignee: The General Electric Company, Schenectady, NY (US)

( * ) Notice: Subject to any disclaimer, the term of this patent is extended or adjusted under 35 U.S.C. 154(b) by 1062 days.

(21) Appl. No.: 11/232,502

(22) Filed: Sep. 22, 2005

(65) Prior Publication Data

US 2007/0176493 A1   Aug. 2, 2007

(51) Int. Cl.
*H02J 1/06* (2006.01)
*A61B 5/00* (2006.01)

(52) U.S. Cl. .......................................... 307/44; 600/300
(58) Field of Classification Search .................... 307/44, 307/43, 46, 64–66; 600/300, 301, 481
See application file for complete search history.

(56) References Cited

U.S. PATENT DOCUMENTS

| | | | | |
|---|---|---|---|---|
| 6,221,012 B1 * | 4/2001 | Maschke et al. | ............ | 600/301 |
| 6,625,552 B1 * | 9/2003 | Delvecchio et al. | ........... | 702/63 |
| 6,958,705 B2 * | 10/2005 | Lebel et al. | ............ | 340/870.07 |
| 7,129,836 B2 * | 10/2006 | Lawson et al. | ......... | 340/539.12 |

* cited by examiner

*Primary Examiner*—Albert W Paladini
(74) *Attorney, Agent, or Firm*—Andrus, Sceales, Starke & Sawall, LLP

(57) ABSTRACT

The present invention is a method and system for powering a patient monitoring system. The present invention is a modular patient monitoring system utilizing a bi-directional power bus to efficiently couple a multi-parameter acquisition device, a display and any number of expansion modules. Each coupled device includes a battery, enabling each device to send or receive power through the bi-directional bus. The method and system of the present invention utilizes power from any single battery or from any number of the batteries in the system, as charge is not transferred from one battery to another. The present invention allows for the batteries to charge when it is operated from AC mains derived power.

24 Claims, 4 Drawing Sheets

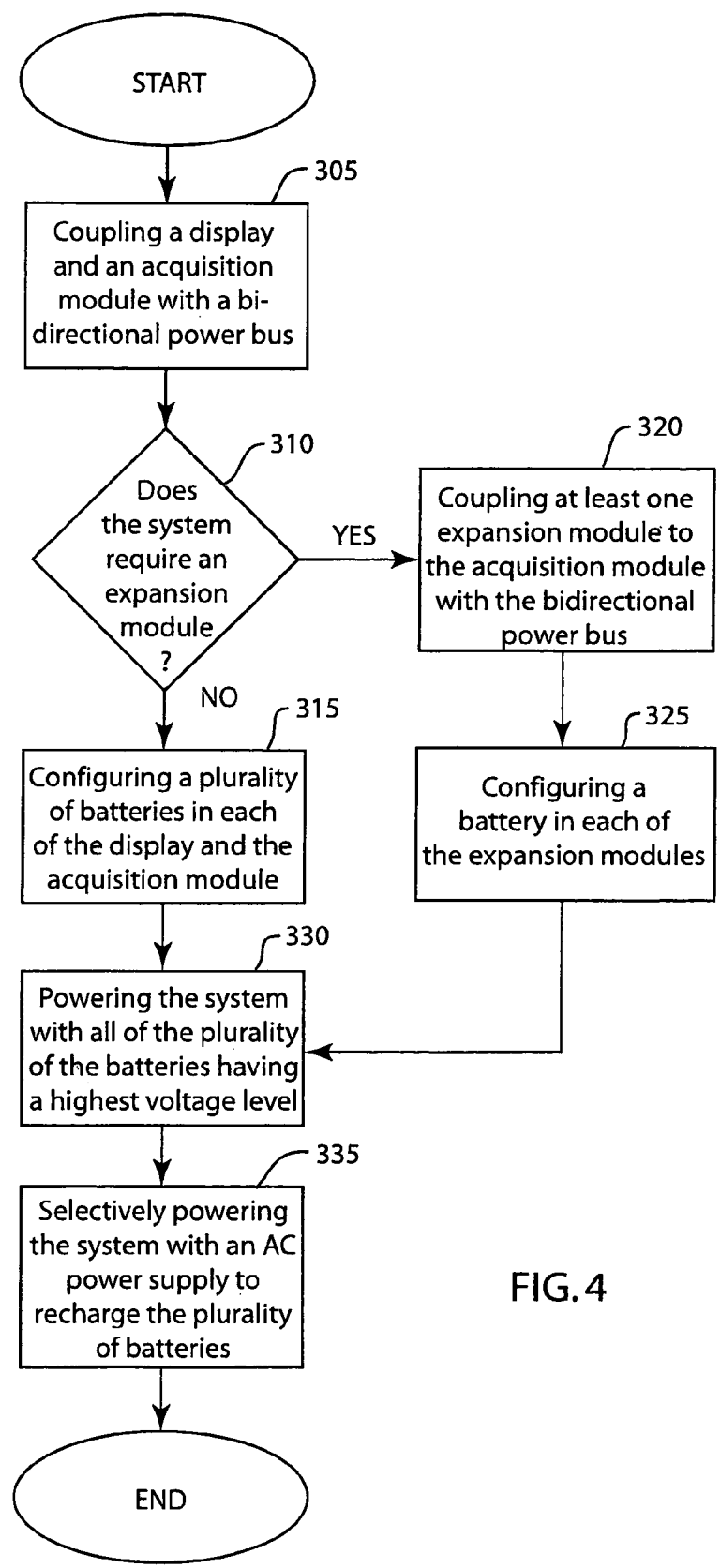

METHOD AND SYSTEM FOR POWERING A PATIENT MONITORING SYSTEM

FIELD OF THE INVENTION

The invention relates to the field of patient monitoring systems. More particularly, the invention relates to the field of providing battery power for modular patient monitors.

BACKGROUND OF THE INVENTION

Transporting patients throughout a hospital or clinic, or in an ambulance or helicopter requires patient monitors that may be modular or configured. These monitors generally include a multi-parameter acquisition device (acquisition device) and a display. There are two current systems for providing portable power to a patient monitor while transporting a patient. FIG. 1A and FIG. 1B depict these two current systems.

Referring to FIG. 1A, a current modular patient monitor 10 is depicted. The modular patient monitor 10 includes a display 2, a multi-parameter acquisition device (acquisition device) 4, batteries 6 and a conduit 8 coupling the display 2 to the acquisition device 4. In this modular patient monitor 10, the batteries 6 that provide power to both the display 2 and the acquisition device 4 are contained in the display 2. Often times, this modular patient monitor 10 will include a display 2 having a single battery 6. The single battery 6 or plurality of batteries 6 included in the display 2, power both the display 2 and the acquisition device 4.

Referring now to FIG. 1B, the modular patient monitor 20 includes a display 12, an acquisition device 14, a battery 16 and a conduit 18. Once again, the conduit 18 couples the display 12 to the acquisition device 14. In this modular patient monitor 20, the battery 16 is included in the acquisition device 14, and is still required to power both the acquisition device 14 and the display 12. Because the battery 16 is included in the acquisition device 14, this modular patient monitor requires less battery management than the modular patient monitor 10 depicted in FIG. 1A.

Generally speaking, the customers must choose between the modular patient monitor 10 depicted in FIG. 1A and the modular patient monitor 20 depicted in FIG. 1B, as neither system has the ability to switch between the two operating modes without purchasing the other system. Neither the modular patient monitor 10 depicted in FIG. 1A, nor the modular patient monitor 20 depicted in FIG. 1B described above allow for an expansion module to be powered during transport, as allowing such an expansion module would significantly decrease the run time of the system. Furthermore, there is no means to increase the system run time in either the modular patient monitor 10 or the modular patient monitor 20, and neither system has the flexibility to adapt to future power sources. Even when additional batteries 6, 16 are added to either modular patient monitor 10, 20, both systems operate from a single battery 6 sequentially, which increases the load current, and negatively effects run time and reliability.

SUMMARY OF THE INVENTION

The present invention is a method and system for powering a patient monitoring system. The present invention is a modular patient monitoring system utilizing a bi-directional powerbus to efficiently couple a multi-parameter acquisition device, a display and any number of expansion modules. Each coupled device includes a battery, enabling each device to send or receive power through the bi-directional bus. The method and system of the present invention utilizes power from any single battery or from any number of the batteries in the system, as charge is not transferred from one battery to another. The present invention allows for the batteries to charge when it is operated from AC mains derived power. 1A.

A system for powering a modular patient monitoring system during transport comprising a display, an acquisition module, a bi-directional power bus, wherein the bi-directional power bus is configured to couple the display and the acquisition module, and further wherein the bi-directional power bus is configured to transfer power bi-directionally between the display and the acquisition module, and a plurality of batteries, wherein the plurality of batteries are configured in each of the display and the acquisition module, and further wherein the system is powered by all of the plurality of batteries having a highest voltage level. The system further comprising at least one expansion module coupled to the acquisition module through the bi-directional power bus, wherein the expansion module includes one of the plurality of batteries, wherein the expansion module is a physiological module, and wherein the expansion module is a power module. The system wherein the bi-directional power bus is configured to transfer power bi-directionally between the acquisition module, the expansion module, and the display, and wherein the acquisition module, at least one expansion module and the display remain powered when the display is disconnected from the acquisition module. The system further comprising a wireless option wherein when the display is disconnected from the acquisition module and the wireless option is enabled, patient monitoring will continue until the plurality of batteries are discharged and further comprising an AC power supply coupled to the system, wherein the AC power supply is configured to inherently or automatically power the system, and further wherein the AC power supply is configured to recharge the plurality of batteries. The system wherein when the system is initially powered, the acquisition module remotely turns on the display and vice-versa and wherein the acquisition module can remotely enable the at least one expansion module between a stand by mode, a normal mode and off. The system wherein each of the display, the acquisition module and the at least one expansion module monitors its own local powerbus and issues a system powerdown and wherein the plurality of batteries are charged in parallel or in a controlled sequential manner to provide charge balancing. The system wherein each of the display, the acquisition module and the at least one expansion module is configured to isolate its battery from a charger to minimize inrush and leakage currents and wherein when any of the display, the acquisition module and at least one expansion module are connected to an unpowered device, the unpowered device will automatically be turned on. The system wherein the acquisition module and the display have a Power On function, a Power Off function and a Standby function, each of the said functions being able to be implemented in any combination of hardware, software, local, and remote.

A method of powering a modular patient monitoring system during transport comprising coupling a display and an acquisition module with a bi-directional powerbus, configuring a plurality of batteries in each of the display and the acquisition module, and transferring power bi-directionally between the display and the acquisition module, wherein the system is powered by all of the plurality of batteries having a highest voltage level. The method further comprising coupling at least one expansion module to the acquisition module through the bi-directional powerbus, wherein the expansion module is a physiological module and wherein the expansion module is a power module. The method further comprising transferring power bi-directionally between the acquisition module and the expansion module, wherein the acquisition module, at least one expansion module and the display remain powered when the display is disconnected from the acquisition module. The method further comprising enabling a wireless option, wherein when the display is disconnected from the acquisition module, patient monitoring will continue until the plurality of batteries are discharged and further comprising automatically powering the system with an AC power supply, wherein the AC power supply is configured to recharge the plurality of batteries, wherein when the system is initially powered, the acquisition module remotely turns on the display and vice-versa.

BRIEF DESCRIPTION OF THE DRAWINGS

FIG. 4 illustrates a flow chart of a method in accordance with the preferred embodiment of the present invention.

DETAILED DESCRIPTION OF THE PREFERRED EMBODIMENT

Figure 1A:
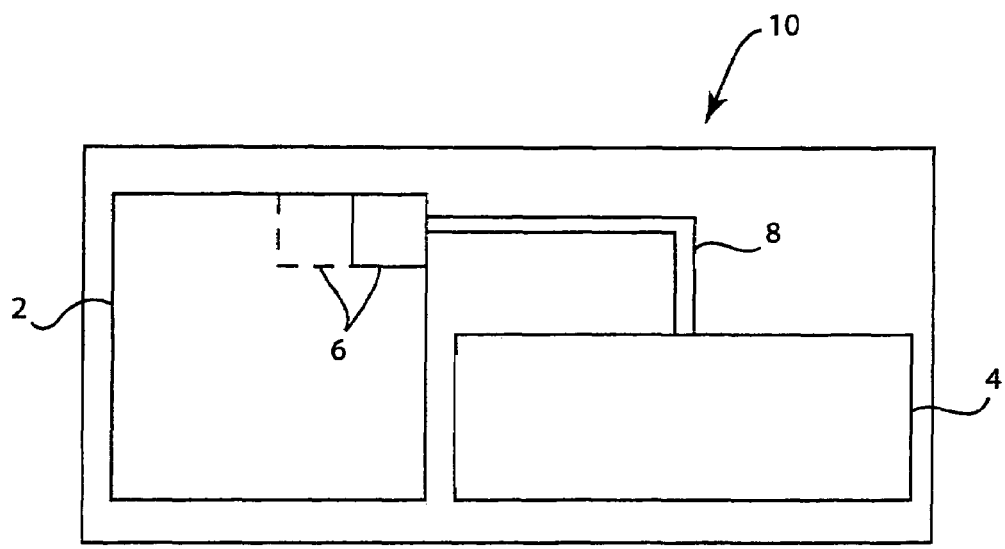
FIG. 1A illustrates a block diagram in accordance with the prior art of the present invention.
Figure 1B:
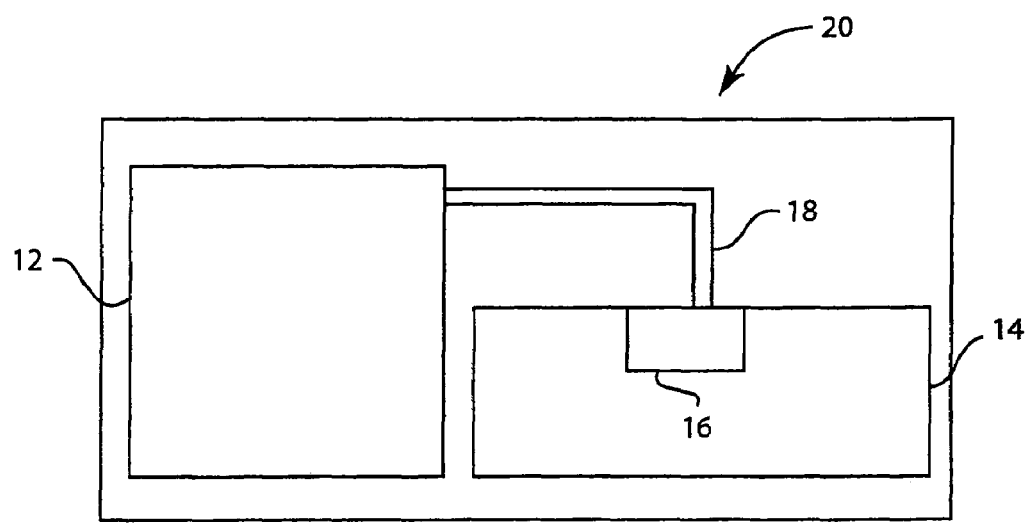
FIG. 1B illustrates a block diagram in accordance with the prior art of the present invention.
Figure 2:
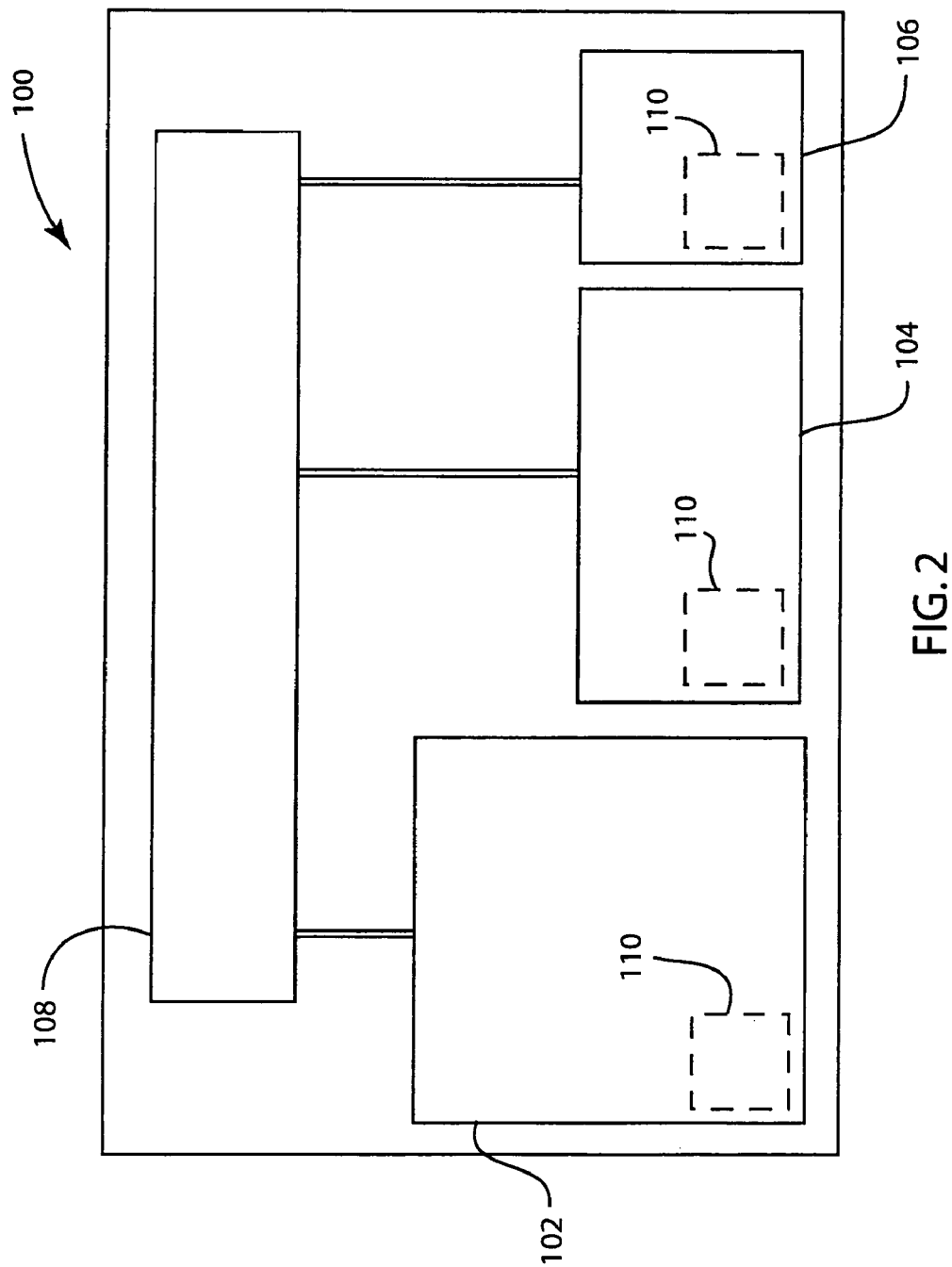
FIG. 2 illustrates a block diagram of a system in accordance with the preferred embodiment of the present invention.

FIG. 2 illustrates a block diagram of a system in accordance with the preferred embodiment of the present invention. Referring to FIG. 2, the modular patient monitoring system 100 includes a display 102, a multi-parameter acquisition device 104, and an expansion module 106, all of which are coupled together by a powerbus 108. Furthermore, each of the display 102, multi-parameter acquisition device 104, and the expansion module 106 include a battery 110. The modular patient monitoring system 100 can include any number of expansion modules 106 that are required. However, system and space constraints known to those skilled in the art may limit the number of expansion modules 106.

As will be discussed in greater detail below, the powerbus 108 of the modular patient monitoring system 100 allows bi-directional power flow to and from each of the batteries in the display 102, the multi-parameter acquisition device 104, and the expansion module 106. The direction and amount of power flow through the powerbus 108 is determined by the relative charge, thus voltage, of each battery 110. Specifically, the modular patient monitoring system 100 is powered by all of the batteries 110 that have a highest voltage level. For example, if the battery 110 located in the display 102 has the highest voltage level of all the batteries 110, then the battery 110 and the display 102 will power the entire modular patient monitoring system 100 until the voltage of the battery 110 in the display 102 equals the voltage level of a battery 110 in either the multi-parameter acquisition device 104 or the expansion module 106. If two or more batteries 110 in the modular patient monitoring system 100 have equal voltages, and have the highest voltage of all of the batteries 110 in the modular patient monitoring system 100, then those batteries 110 with the highest voltage will power the modular patient monitoring system 100 until their charge equals that of the battery 110 having the lowest voltage. A more detailed description of the modular patient monitoring system 100 and its function is included in the following description of FIG. 3.

Figure 3:
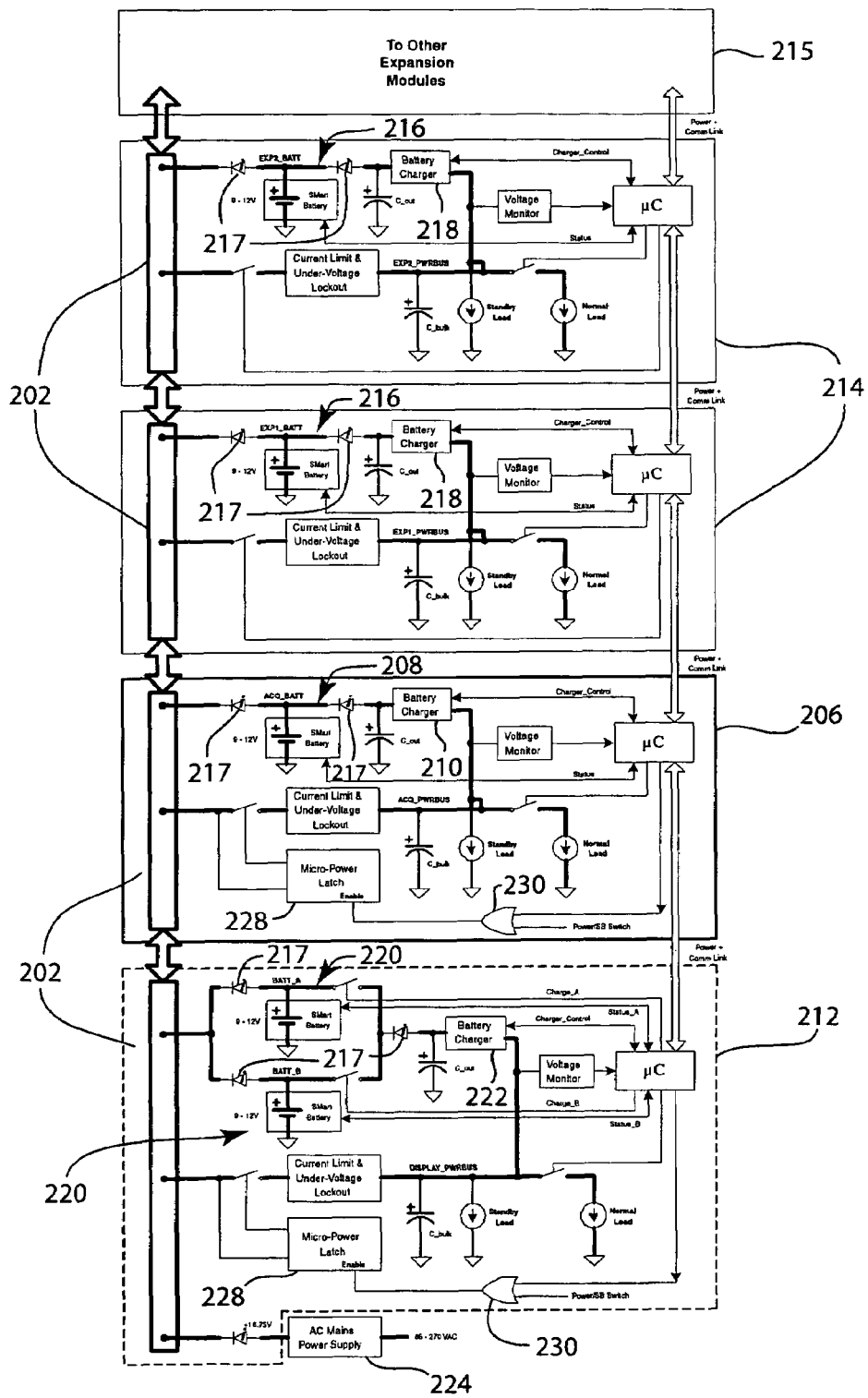
FIG. 3 illustrates a schematic diagram of the system in accordance with the preferred embodiment of the present invention.

Referring to FIG. 3, the modular patient monitoring system 200 of the present invention includes an acquisition module 206, having an acquisition battery pack 208 and an acquisition battery charger 210 that interface via the bi-directional powerbus 202 to a host device 212. The host device 212 is preferably a bedside monitor or a transport display, and can include any host type device known to those skilled in the art. The acquisition module 206 of the present invention is also interfaced to expansion modules 214 through the bi-directional powerbus 202. To prevent diminishing run time during transport due to unknown power requirement of future expansion modules 214, the system of the present invention allows future expansion modules 215 to have their own internal battery management system, including an expansion battery pack 216 and an expansion battery charger 218. Every device has the ability to send or receive power on a bi-directional powerbus 202. The system allows the Acquisition module 206 and/or expansion modules 214 to power the host device 212, and vice-versa, as the host device 212 is preferably equipped with a host battery pack 220 and host battery charger 222. All battery packs 208, 216, 220 of similar capacity and voltage level will simultaneously provide power to all of the devices, including the acquisition module 206, host device 212 and all expansion modules 214 on the powerbus 202, thus lowering the discharge rate of each battery 208, 216, 220 and improving the overall system 200 run time and reliability. It should be noted that the bi-directional powerbus 202 is a culmination of all of the power sources in the system 200, including the host device 212, the acquisition module 206, the expansion modules 214 and any other future expansion module 215. Thus, any power source can provide power to the bias circuitry (228,230), and thus the system 200 can be turned on independent of battery location.

Still referring to FIG. 3, whenever AC mains 224 derived power is available to the acquisition module 206 from the host device 212, the entire system 200 will operate from it and all battery packs 208, 216, 220 will not be providing power to the powerbuses 202. The powerbus 202 architecture of the system 200 is bi-directional only when AC mains 224 derived power is not available, and the system 200 is powered from one or more battery packs 208, 216, 220. A system 200 including a host device 212, an acquisition module 206, and preferably up to five expansion modules 214 can each contain its own internal battery pack 208, 216, 220 that is efficiently diode-OR'd together to a common powerbus 202. This allows any single battery pack 208, 216, 220 to power the entire system 200. However, the preferred mode of operation is for all battery packs 208, 216, 220 to power the system 200 simultaneously, thus lowering the discharge rate of each battery pack 208, 216, 220 to improve overall system 200 reliability and run time.

If the acquisition module 206 and/or an expansion module 214 contain at least one battery 208, 216, and it is disconnected from a host device 212, the acquisition module 206 and all expansion modules 214 will remain powered on. If the wireless option is enabled and host communication is active, monitoring of patient data will continue until the batteries 208 and 216, or battery 220 is completely discharged, whichever is first.

Still referring to FIG. 3, in a preferred embodiment, all of the power sources 208, 216, 220 in the system 200 are efficiently diode-OR'd together by use of a power path controller IC driving an external power MOSFET in parallel with a schottky diode. This combination reduces the forward voltage drop of the regular schottky diode from approximately 500mV to less than 50mV at full load current, creating an almost ideal diode. This allows current to flow in the forward direction with very low voltage drop. However, this configuration blocks current flow in the reverse direction due to the reverse-biased pn junction.

When two or more power sources 208, 216, 220, 224 are diode OR'd together, the power source 208, 216, 220, 224 with the highest voltage will power the entire system 200, while all other power sources 208, 216, 220, 224 will be off of the powerbus since their diodes will be reverse-biased. If the highest voltage power source 208, 216, 220, 224 is a battery 208, 216, 220, its voltage will begin decreasing as it discharges. Eventually, its voltage will decrease to a value near the open circuit voltage on the next highest voltage battery 208, 216, 220 in the system 200.

At this point, the discharge current from the first battery 208, 216, 220 will begin to slowly decrease as current from the second battery 208, 216, 220 begins to slowly deliver current to the load. Since the first battery 208, 216, 220 is supplying most of the load current, its voltage will decrease faster than the second battery 208, 216, 220. As this happens, the voltage of the first battery 208, 216, 220 will become closer to the voltage of the second battery 208, 216, 220. Therefore, the second battery 208, 216, 220 will continue to supply more load current while the first battery 208, 216, 220 supplies less.

Eventually, both batteries 208, 216, 220 will hit equilibrium where their voltages are matched and both batteries 208, 216, 220 will be supplying equal current to the load. At this point, the load current of each battery 208, 216, 220 is approximately half of what the load current was of the first battery 208, 216, 220 when it was supplying the full load. Both batteries 208, 216, 220 will now continue discharging simultaneously until their voltage decreases to a value near the open circuit voltage of the next highest voltage battery 208, 216, 220 in the system, and the process will continue.

In a preferred embodiment, the Acquisition module 206 battery 208 is interfaced to the powerbus 202 with an ideal diode 217, the ideal diode 217 being one known in the art. Likewise, the Acquisition module 206 battery 208 is also interfaced to the output of the battery charger 210 with an ideal diode 217.

Also in the preferred embodiment, the micro-power latch circuitry 228 is required to isolate the acquisition module 206 from the bi-directional powerbus 202 to prevent over-discharge during storage. The micro-powered circuit only biases the minimum circuitry required to allow the acquisition module 206 to turn on following a power off. Whenever the acquisition module's 206 Power ON button 230 is pressed, the unit will enable the micro-power latch circuitry 228 that connects the bi-directional powerbus 202 to the Acquisition module 206, and send a remote signal to the host device 212 to activate its latch that connects the powerbus 202 to the host device 212. This micro-power latch circuitry 228 can also be activated remotely via the host device 212. Furthermore, whenever power is applied via the host device 212, the acquisition module 206 will automatically turn on, thus enabling the micro-power latch circuitry 228. Once the latch 228 is set, the only way to reset it is via a software controlled shutdown command.

It should be noted that both the acquisition module 206 and the host device 212 have a local power on switch. If these two devices are connected, and any power source is present, including the expansion module 214 battery 216, turning one device on, will remotely turn on the other device. Furthermore, if the acquisition device 206 and the host device 212 are disconnected, and one device is on and the other is off, when the two devices are connected, the device that is powered off will automatically turn on.

Referring now to FIG. 4, the method of the preferred embodiment of the present invention is depicted. In step 305, a display or some other host device is coupled with an acquisition module with a bi-directional powerbus. In step 310, if the system requires an expansion module, at least one expansion module is coupled to the acquisition module with the bi-directional powerbus in step 320. In step 325, a battery is configured in each of the expansion modules. In step 310, if the system does not require an expansion module, then a plurality of batteries is configured in each of the display and the acquisition module in step 315. In step 330, the system is powered with all of the plurality of batteries having a highest voltage level. In step 335, the system is selectively powered with an AC power supply to recharge the plurality of batteries.

The system and method of the present invention includes a number of benefits over the systems of the prior art. The present invention allows all devices connected to the bidirectional powerbus, including the display, to share all available power until all batteries are depleted, and further allows an acquisition module to power a transport display.

The present invention is in direct response to a major customer need to maintain battery management in the acquisition module only. This avoids developing specialty products for select customers and also enables a low cost battery-less future transport display. Furthermore, all future expansion modules have increased system run time during transport, and can further contain their own battery. This maintains system run time due to unknown power requirements of future transport modules, enabling system scalability.

Because all batteries in the system can supply current to all devices simultaneously, the discharge current of each individual battery is decreased by dividing the total load among all batteries, improving overall system run time and battery aging.

The present invention is scaleable and very simple to add additional power sources within a particular device due to the hardware's inherent load sharing. All expansion modules in the system will contain similar power architecture as in the acquisition module, thus enabling minimal development time for future modules. The present invention also features low cost implementation due to simple hardware design with very little software.

The system also includes very efficient power sharing using "ideal" diodes, that have lower forward voltage, resulting in longer system run time, lower heat dissipation, and improved reliability. The acquisition module of the system and all other devices operate over a wide input voltage range, and power is converted in a single stage, resulting in higher efficiency, longer run time, reliability. Each device automatically runs off of the power source(s) with the highest voltage, and each device provides its own input current limit, inrush control, and under-voltage lockout. This allows other devices to hot swap onto the powerbus without disrupting it or other devices already connected. This enables the system powerbus to remain on even if any other device has a fault.

In the system of the present invention, individual modules can be selectively powered on or off or low power standby, independent of where they are in the stack. Standby allows charging of all batteries in the system when powered from AC. This also allows shutting down expansion modules not in use, while still using their available power to improve system run time. Flexible powerbus architecture supports a multitude of system configurations to best suit our customer's current and future needs. This results in fewer products that work with a wider customer base.

The present invention has been described in terms of specific embodiments incorporating details to facilitate the understanding of the principles of construction and operation of the invention. Such reference herein to specific embodiments and details thereof is not intended to limit the scope of the claims appended hereto. It would be apparent to those skilled in the art that modifications may be made in the embodiment chosen for illustration without departing from the spirit and scope of the invention.

What is claimed is:

1. A system for powering a modular patient monitoring system during transport, the system comprising:
   a) a display;
   b) an acquisition module;
   c) a bi-directional power bus, wherein the bi-directional power bus is configured to couple the display and the acquisition module, and further wherein the bi-directional power bus is configured to transfer power bi-directionally between the display and the acquisition module; and
   d) a plurality of batteries, wherein the plurality of batteries are configured in each of the display and the acquisition module, and further wherein the system is powered by all of the plurality of batteries having a highest voltage level.

2. The system as claimed in claim 1, further comprising at least one expansion module coupled to the acquisition module through the bi-directional power bus, wherein the expansion module includes one of the plurality of batteries.

3. The system as claimed in claim 2, wherein the expansion module is a physiological module.

4. The system as claimed in claim 2, wherein the expansion module is a power module.

5. The system as claimed in claim 2, wherein the bi-directional power bus is configured to transfer power bi-directionally between the acquisition module, the expansion module, and the display.

6. The system as claimed in claim 2, wherein the acquisition module, the at least one expansion module and the display remain powered when the display is disconnected from the acquisition module.

7. The system as claimed in claim 6, further comprising a wireless option wherein when the display is disconnected from the acquisition module and the wireless option is enabled, a patient monitoring will continue until the plurality of batteries are discharged.

8. The system as claimed in claim 1, further comprising an AC power supply coupled to the system, wherein the AC power supply is configured to inherently or automatically power the system, and further wherein the AC power supply is configured to recharge the plurality of batteries.

9. The system as claimed in claim 1, wherein when the system is initially powered, the acquisition module remotely turns on the display and vice-versa.

10. The system as claimed in claim 2, wherein the acquisition module can remotely enable the at least one expansion module between a stand by mode, a normal mode and off.

11. The system as claimed in claim 2, wherein each of the display, the acquisition module and the at least one expansion module monitors its own local powerbus and issues a system powerdown.

12. The system as claimed in claim 1, wherein the plurality of batteries are charged in one of in parallel or in a controlled sequential manner to provide charge balancing.

13. The system as claimed in claim 2, wherein each of the display, the acquisition module and the at least one expansion module is configured to isolate its battery from a charger to minimize in-rush and leakage currents.

14. The system as claimed in claim 2, wherein when any of the display, the acquisition module and the at least one expansion module are connected to an unpowered device, the unpowered device will automatically be turned on.

15. The system as claimed in claim 1, wherein the acquisition module and the display have a Power On function, a Power Off function and a Standby function, each of the said functions being able to be implemented in any combination of hardware, software, local, and remote.

16. A method of powering a modular patient monitoring system during transport, the method comprising:
    a) coupling a display and an acquisition module with a bi-directional powerbus;
    b) configuring a plurality of batteries in each of the display and the acquisition module; and
    c) transferring power bi-directionally between the display and the acquisition module,
       wherein the system is powered by all of the plurality of batteries having a highest voltage level.

17. The method as claimed in claim 16, further comprising coupling at least one expansion module to the acquisition module through the bi-directional powerbus.

18. The method as claimed in claim 17, wherein the expansion module is a physiological module.

19. The method as claimed in claim 17, wherein the expansion module is a power module.

20. The method as claimed in claim 17, further comprising transferring power bi-directionally between the acquisition module and the expansion module.

21. The method as claimed in claim 17 wherein the acquisition module, the at least one expansion module and the display remain powered when the display is disconnected from the acquisition module.

22. The method as claimed in claim 21, further comprising enabling a wireless option, wherein when the display is disconnected from the acquisition module, patient monitoring will continue until the plurality of batteries are discharged.

23. The method as claimed in claim 16, further comprising automatically powering the system with an AC power supply, wherein the AC power supply is configured to recharge the plurality of batteries.

24. The method as claimed in claim 18, wherein when the system is initially powered, the acquisition module remotely turns on the display and vice-versa.

* * * * *

UNITED STATES PATENT AND TRADEMARK OFFICE
CERTIFICATE OF CORRECTION

PATENT NO. : 7,638,897 B2  Page 1 of 1
APPLICATION NO. : 11/232502
DATED : December 29, 2009
INVENTOR(S) : Koski, II et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1133 days.

Signed and Sealed this

Ninth Day of November, 2010

David J. Kappos
*Director of the United States Patent and Trademark Office*